Dec. 30, 1958 W. B. ZELINA 2,866,944
UNIDIRECTIONAL VOLTAGE CONTROL
NETWORK FOR GENERATOR SYSTEMS
Filed Sept. 24, 1956
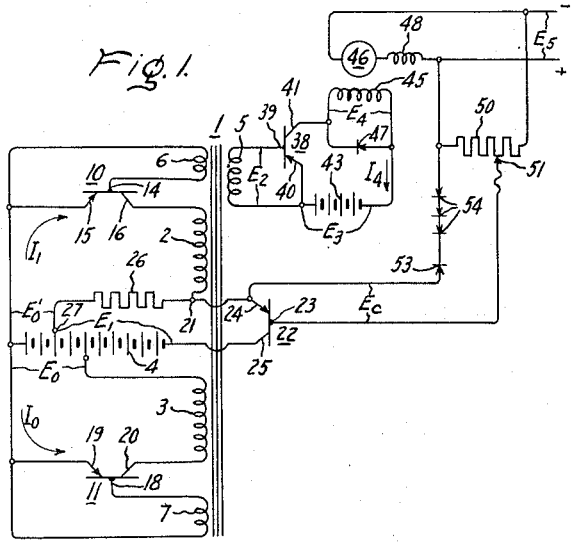
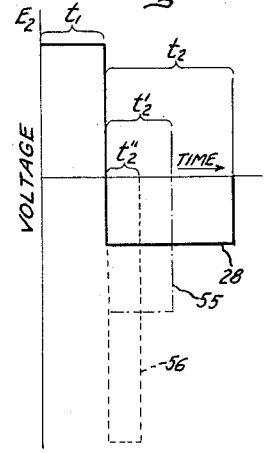
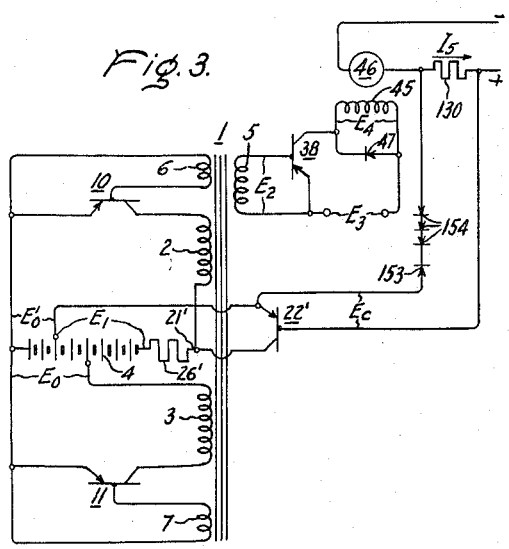
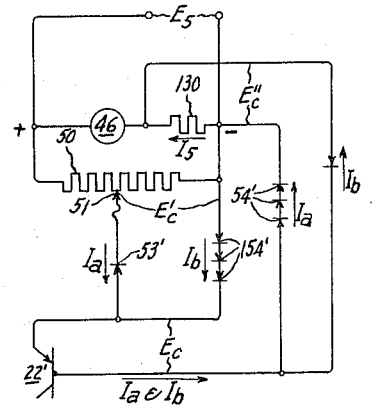
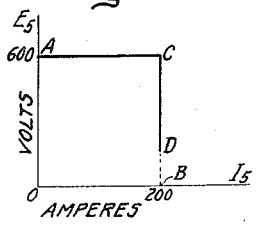
Inventor:
William B. Zelina,
by David P. Ogden
His Attorney.

United States Patent Office 2,866,944
Patented Dec. 30, 1958

2,866,944

UNIDIRECTIONAL VOLTAGE CONTROL NETWORK FOR GENERATOR SYSTEMS

William B. Zelina, Erie, Pa., assignor to General Electric Company, a corporation of New York Application September 24, 1956, Serial No. 611,555

13 Claims. (Cl. 322—25)

My invention relates to a unidirectional voltage control network and more particularly to a network delivering an output voltage representing the product or function of variable unidirectional voltages applied thereto.

In some of its aspects, this invention is an improvement over my co-pending application, Serial Number 505,715, filed May 3, 1955, and assigned to the assignee of the present application.

For many years the railroad industry has been searching for a simple, reliable and rugged regulating network free of moving parts or rotating machines that will operate continuously and satisfactorily as a unidirectional voltage amplifier of substantial power capacity. Such a network would find ready application in control systems including voltage regulators for field windings, unidirectional dynamoelectric machine control networks and in many devices which require an amplifier having a unidirectional input signal and a unidirectional output signal. In the past, mechanisms of this type have included transducer elements or transformer elements requiring an alternating current power supply or very sensitive sensing device to transform unidirectional voltage signals to alternating current signals which would operate with an alternating voltage amplifying system. Other attempts to provide a unidirectional amplifier have included complicated amplifier circuits using vacuum tubes which are fragile and require a separate source of relatively high unidirectional voltage. Still other attempts to provide such amplification have relied on exciter type dynamoelectric machines which are initially expensive, expensive to maintain and often inaccurate or objectionable because of the inertia of the moving parts.

Therefore, an object of my invention is to provide a simple and inexpensive unidirectional regulating network capable of developing a composite signal of considerable power capacity.

A further object of my invention is to provide a simple, reliable, rugged and low cost network for combining unidirectional voltages.

A further object of my invention is to provide a simple and reliable regulating nework for unidirectional dynamoelectric machines.

In carrying out my invention in one form, one input voltage is utilized to modify the transfer action of a self-excited rectangular wave oscillator having its feedback path completed through the mutual coupling of windings disposed on a saturable magnetic core by controlling the time during of half cycles of one polarity. The output signal of this rectangular wave oscillator is then applied to an electronic switching device adapted to be conductive during positive half cycles of the oscillator output voltage. The instantaneous current through the switching device is proportional to a second input voltage and the average current through the switching device is a resultant function of both input voltages. In order to provide a regulator, one or both of the voltages may be proportional to a function of a dynamoelectric machine with the switching device controlling the machine's excitation.

The subject matter which I regard as my invention is particularly pointed out and distinctly claimed in the concluding portion of this specification. My invention, however, both as to its organization and method of operation together with further objects and advantages thereof will best be understood by reference to the following description taken in connection with the accompanying drawing, in which:

Fig. 1 is a schematic circuit showing one embodiment of my invention;

Fig. 2 shows the rectangular wave shapes produced in the secondary circuits of the oscillator of my invention;

Fig. 3 is a schematic circuit showing a modification of my invention;

Fig. 4 is a schematic circuit showing another modification of my invention; and

Fig. 5 shows a curve of the control obtainable with the circuit of Fig. 4.

Referring now to the drawing in which like numerals refer to similar parts, in Fig. 1, I have shown a saturable transformer 1 having a pair of similar primary windings 2 and 3. The windings 2 and 3 are coupled magnetically to the core of the transformer 1 so that a current $I_0$ or $I_1$ alternately flowing through these windings respectively from a portion of a battery 4 connected as shown will cause an alternating flux excursion in the transformer 1. A secondary winding 5 is excited by this alternating flux excursion to have induced therein an alternating voltage $E_2$ as shown in Fig. 2. Tertiary or switching windings 6 and 7 are coupled magnetically to the core of the transformer 1 to have induced in each a similar alternating switching signal for alternately enhancing current flow through the transistors 10 and 11 respectively.

The transistor 10 has a base electrode 14, an emitter electrode 15 and a collector electrode 16. The transistor 11 has a base electrode 18, an emitter electrode 19 and a collector electrode 20. In order to connect the transistors so that they may enhance or impede current flow in response to the flux excursion of the transformer 1 and the current in the primary windings 2 and 3, one terminal of the tertiary winding 6 is connected to the base electrode 14 and the other terminal is connected to the emitter electrode 15. Similarly, the transistor 11 is made conductive by a positive half cycle of the switching voltage in the winding 7 because of the connection of the base electrode 18 and the emitter electrode 19 to respective terminals of the switching winding 7.

Unidirectional voltages $E_0$ and $E_0'$ from the battery 4 are connected in circuit with the emitter and collector electrodes of the transistors 10 and 11 respectivly in a sense to enhance current flow through the transistors alternately when one of the switching voltages of the windings 6 and 7 promotes conduction therein. For the purpose of understanding the operation of the transistors 10 and 11 clearly, they may be compared to a water faucet with the voltage between the electrodes 15–16 and 19–20 equivalent to water pressure and the voltages at the electrodes 14 and 18 used to open or close the faucet. According to my invention, the faucet or transistors 10 and 11 are either fully on or off.

In order to vary the relative pulse width or half cycle time duration of the current flow necessary to saturate the transformer 1, the primary winding 2 has one terminal connected to the transistor 10 and a second terminal connected to a transistor 22. The transistor 22 is similar to transistors 10 and 11 having a base electrode 23 and an emitter electrode 24 and a collector electrode 25. The collector electrode 25 of the transistor 22 is electrically connected to the battery 4 having a voltage $E_1$ across the non-conductive transistor 22. In order to allow operation of the oscillator when no signal is available to turn on the transistor 22, a resistor 26 is connected between one terminal of the primary winding 2 and connected directly to a terminal 27 of the battery 4. When the transistor 22 becomes conductive, it and the resistor 26 cooperate to act as a variable voltage divider to vary the voltage across the primary winding 2 between $E_0'$ and $E_0'+E_1$. The resistor 26 is selected to have a resistance that is much less than that of the non-conducting transistor 22 so that with the current $I_1$ contemplated, there will be an insignificant voltage drop across the resistor 26. However, compared to the voltage drop across the fully conductive transistor 22, the resistance of the resistor 26 is very large so that the voltage drop across the transistor 22 becomes insignificant.

I prefer to have the resistor 26 large enough to limit the current through the transistor 22 to a reasonable value. Therefore, in one particular instance, the impedance of the primary winding 2 may be 5,000 ohms, the resistance of the resistor 100 ohms, and the impedance of the transistor 22 variable between infinity and .1 ohm. In this instance, the voltage $E_1$ may be selected to be a value such as 20 volts whereby the transistor 22 current is limited to 20/100 ($E_1/R_{26}$) or .2 ampere maximum.

The circuit components are chosen so that the impedance of the primary winding circuits are predominately inductive and the current of the primary windings is increasing continuously until saturation is reached. Thus, I have developed a rectangular wave oscillator wherein the alternate wave half cycle time duration is controllable.

Operation

Assuming that the transistor 22 is non-conductive and that the component parts of a relaxation oscillator are substantially identical with inherent or residual characteristics to promote current flow in the transistor 11 when the voltage $E_0$ is applied from the battery 4, it is apparent that the current $I_0$ will start the flow through the transistor 11. In order to continue this operation until the transformer 1 is saturated by the current $I_0$ flowing in the transistor 11 and the winding 3, I have connected the switching winding 7 to the transistor 11 to provide a switching signal to enhance current flow therethrough during this flux excursion. The winding 6 is coupled to the transformer 1 to provide a signal which will apply a voltage to the base electrode 14 to create a barrier layer in and thus inhibit current flow through the transistor 10.

As long as the flux excursion of the transformer 1 is changing, the transistors 10 and 11 act as electronic switching devices which alternately connect the unidirectional supply voltages $E_0'$ and $E_0$ to allow current flow in the transistor 11 positively magnetizing the transformer core and, after positive saturation is reached in the transformer core, to allow current flow in the transistor 10 in a direction of negative magnetization. I prefer to use only switching devices capable of switching frequencies above 100 cycles per second and capable of operating without a separate source of high voltage.

The increasing current $I_1$ or $I_0$ in the loop circuits will soon drive the flux excursion of the transformer core to a saturation limb at which time further flux excursion can not occur. When saturation is reached with the saturable transformer 1, the induced voltages in the tertiary windings 6 and 7 collapse almost instantly. For an instant, both transistors 10 and 11 return to the unbiased state with no potential being applied between their emitter or base electrodes. The flux in the transformer drifts along the saturation limb of the transformer hysteresis loop which is effectively the residual magnetism of the core after having been saturated in the positive direction. This drift, which occurs in less than a microsecond, constitutes a sufficiently negative rate of change flux to reverse all of the polarities of the induced voltages in the windings of the transformer 1.

Reversal of the voltage in the switching winding 7 creates a barrier between the base and the emitter electrodes to inhibit further current flow between the emitter and collector electrodes of the transistor 11. At the same time, reversal of the voltage in the switching winding 6 removes the barrier layer of the transistor 10 to enhance conduction therethrough. As soon as the impedance of the transistor 10 is reduced, current $I_1$ caused by the battery voltage $E_0'$ flows through the loop circuit including the transistor 10 and the winding 2, whereby the flux of the transformer 1 is driven toward the opposite saturation limb. When the saturation of the transformer is reached in the opposite polarity, the switching voltage induced in the winding 6 collapses, the transistor 10 has its impedance increased and the cycle is repeated.

This results in an induced voltage $E_2$ in the windings 5, 6 and 7 having a rectangular wave shape (Fig. 2, curve 28) having half cycle time durations $t_1$ and $t_2$ which are dependent on the magnitude of the voltages $E_0$ and $E_0'$ and the reactance of the transformer windings 2 and 3. It should be noted that since the total flux excursion is a constant depending on the physical properties of the transformer 1 and the rate of the flux excursion depending on $E_0'$ or $E_0$, the basic frequency is directly proportional to the battery voltages. However, in Fig. 1, the voltage $E_0'$ is less than $E_0$ and the current $I_1$ in the primary winding 2 is similarly less than $I_0$ in the winding 3. This results in a wave shape 28 having a greater voltage and a shorter pulse width or time duration $t_1$ during the positive half cycle when the winding 3 is conductive than during the negative half cycle pulse width or time duration $t_2$ when the winding 2 is conductive.

Secondary network

The secondary winding 5 is wound on the core of the transformer 1 to be energized by the transformer flux excursion and, therefore, has induced therein the voltage $E_2$ having the rectangular voltage wave shape 28. In order to regulate current flow in the secondary circuit, a fourth transistor 38 has its base and emitter electrodes 39 and 40 connected across this secondary winding in a sense whereby current flow is enhanced between the emitter electrode 40 and a collector electrode 41 whenever a positive half cycle is induced in the winding 5. I prefer to use the half cycles $t_1$, having a constant voltage, for enhancing current flow in the transistor 38 so that its conductance will be stable and of a consistent quantity regardless of any voltage magnitude variation of the other half cycle $t_2$.

A source of power such as a battery 43, having a terminal voltage $E_3$, and a field winding 45 are serially connected across the emitter and collector electrodes of the transistor 38 whereby current flow from the battery 43 through the transistor 38 will energize the field winding 45 to excite a device such as a dynamoelectric machine 46.

It should be noted that the output wave 28 (Fig. 2) will allow the transistor 38 to conduct for only the half cycle period $t_1$ and voltage $E_4$ supplied to the field winding 45 will actually be fluctuating. To reduce the fluctuations of current $I_4$ in the winding, a commutating rectifier 47 is connected across the field winding 45 which effectively integrates the fluctuating current $I_4$. The rectifier 47 is selected to have a low impedance during a forward conducting period when the transistor 38 is turned off. Because of the combined action of the inductance of the winding 45 and the conductance of the commutating rectifier 47, the current flowing through the field winding 45 will not fluctuate appreciably even at switching frequencies as low as 100 cycles per second. This arrangement will reduce the decay of the field by preventing fluctuation or ripple current in the field winding 45. Thus, the field winding 45 may be energized as a main field winding to control the excitation of the machine 46 or as a differential field winding to modify the excitation of a series field winding 48.

It is apparent from the circuit shown in Fig. 1 that the function of the rectangular wave oscillator portion of the circuit is to produce an alternating switching voltage $E_2$ in the secondary winding 5. However, in order to attain voltage regulation, the negative half cycle time duration $t_2$ (preferably the "off" time of the transistor 38) of this switching voltage may be varied to control the average impedance of the transistor 38.

*Half cycle time variation*

Although it will be apparent from the following discussion that the positive half cycle time duration $t_1$ could be varied by connecting a similar voltage divider arrangement between terminals of the battery 4 and the end of the winding 3, I will consider it a constant.

In order to reduce the negative half cycle time duration $t_2$ during which the switching transistor 38 is nonconductive, the transistor 22 is energized by a control signal to partially shunt the resistor 26. This shunting action causes battery current from the terminal 27 to flow through the resistor 26 and the transistor 22 which will vary the voltage at the voltage tap 21, to increase the total voltage across the primary winding 2 and reduce the negative half cycle time duration $t_2$. Reducing the "off" time $t_2$ of the transistor 38 will effectively increase the average current $I_4$ in the field winding 45.

A slight reduction of the impedance of the conducting transistor 22 will cause the output voltage wave shape to be rectangular with the period $t_1$ and $t_2'$ of each half cycle having an equal time duration as shown in dashed line curve 55, Fig. 2.

The addition of the entire voltage $E_1$ to the voltage $E_0'$ increases the magnitude of $I_4$ and causes saturation in the negative direction to occur much more rapidly than it can occur in the positive direction where $E_0$ is the only effective voltage. Thus, since the parameters of the oscillator circuit are chosen with transistors 10 and 11 similar, the primary windings 2 and 3 similar and the windings 6 and 7 similar, addition of the voltage $E_1$ to the voltage $E_0'$ will cause the time $t_2''$ (Fig. 2 dotted curve 56) to be decreased from $t_2$ whereby, neglecting insignificant losses of the circuit, the ratio between $t_2''$ and $t_2$ is equal to $E_0'/(E_0'+E_1)$.

In one particular case, $E_0'$ and $E_1$ may be considered to have a ratio of 1:9 so that $t_2''$ is one-tenth as great with the transistor 22 fully conductive as $t_2$ is with the transistor 22 non-conductive. This similarly reduced the time the transistor 38 is non-conductive and effectively increases the voltage $E_4$ across the field winding 45. In fact, if the ratio $E_0':E_0$ and $t_1:t_2$ is 1:2, and while $(E_0'+E_1):E_0$ and $t_1:t_2''$ is 5:1, the average time of conductance of the transistor 38 is changed from a ratio of 1:3 to 5:6. Thus, $E_4$ may equal any value between $E_3/3$ and $5E_3/6$. With this arrangement, an average field winding excitation current $I_4$ in the field winding 45 may be increased from its minimum value by 150 percent.

*Maximum voltage limit*

In many control circuits, it is desirable to control an output voltage $E_5$ of the dynamoelectric machine 46. When the voltage $E_5$ across the machine 46 reaches a predetermined value such as 600 volts which is sensed across a voltage divider 50, a voltage tap 51 on the voltage divider 50 is positioned to sense a portion of the desired voltage $E_5$ which portion is sufficient to cause conductance through a Zener diode 53.

The Zener diode 53 is a dry rectifier operating in a reverse direction, and it will carry current only when there is a predetermined voltage across its terminals. Thus, it acts like a constant voltage impedance. Breakdown of the Zener diode 53 causes a control or differential voltage $E_c$ across and a current flow between the emitter electrode 24 and the base electrode 23 of the transistor 22 in a sense to enhance current flow between the emitter electrode 24 and the collector electrode 25. Thus, the transistor barrier layer is removed and the voltage terminal 21 is more negative than prior to any conductance in the transistor 22. The operation of the Zener diode 53 and the temperature compensating rectifiers 54 are explained in detail in my co-pending application for Letters Patent, Serial Number 579,193, filed April 19, 1956, and assigned to the assignee of the present application.

Under particular conditions contemplated, if the field winding 45 is a differential field winding of the dynamoelectric machine 46 having the main series field winding 48, a 150 percent increase in the excitation current $I_4$ will immediately reduce the total of the excitation of the machine and reduce the terminal voltage $E_5$. In fact, with a selected turns ratio having many turns in the winding 45 and few turns in the winding 48 and a proper setting of the voltage tap 51, an increase of $E_5$ by a few percent may cause the transistor 22 to have a negligible resistance. With such operation, it is feasible to have the excitation of the differential winding 45 compensate for the field of the winding 48 to an extent which will substantially reduce the total excitation of the machine 46. As the relative resistance of the resistor 26 in the voltage divider 22—26 will be increased by a reduction of the impedance of the transistor 22, I prefer to choose the secondary circuit components so that the time duration $t_2''$ will not be reached. Instead, a value of the negative time duration $t_2'$ could be the usual value contemplated. For this operation during normal loading, $E_3$ is chosen to be equal to $2E_4$ whereby $I_4$ is the desirable differential field current for normal loading of the machine 46 which will provide an average signal $E_c$ across the transistor 22.

It is readily apparent that if a new terminal voltage $E_5$ is desired to be maintained across the terminals of the machine 46, the voltage tap 51 may be moved to a different setting on the voltage divider 50. It is also apparent that the relative difference between the voltages $E_0'$ and $E_1$ could be increased to provide a larger percent variation between the source voltage $E_3$ and the excitation voltage $E_4$ without departing from the spirit of my invention.

In Fig. 3, I have shown a secondary circuit arrangement whereby the field winding 45 may be connected as a main field winding. My invention, if connected to the voltage divider control signal $E_c$ (shown in Fig. 1) would still provide a control which would limit the maximum voltage. In order to accomplish this, I have reversed the components (22'—26') of the voltage divider so that no conductance in the transistor 22' results in the voltage at a terminal 21' being equal to $E_0'+E_1$. Thus, no control voltage $E_c$ results in the half cycle time durations $t_1$ and $t_2''$ (curve 56).

An average signal voltage $E_c$ will cause conductance in the transistor 22' sufficient to reduce the voltage across the winding 2, to provide a time duration $t_2'$ (curve 55). Further increase in $E_c$ will increase the negative half cycle time duration to approach a value $t_2$ (curve 28). With this arrangement, I am able, with a decreasing output voltage $E_5$ to increase the excitation current $I_4$ from a minimum value proportional to $E_3/3$ to a maximum value proportional to $5E_3/6$, an increase of 150 percent. It is important that this increase of excitation current $I_4$ occurs with a decrease in the voltage $E_c$ so that with a machine having only a main field winding, the output voltage $E_5$ may be readily controlled.

*Maximum current limit*

Also, in Fig. 3, I have shown a circuit suitable for controlling a load current $I_5$ of the dynamoelectric machine 46. The transistor 22' and a Zener diode 153 are connected in circuit with a current measuring shunt 130 which senses the load current $I_5$ of the machine 46. It is well known that the shunt 130 could be a series field excitation winding or could be replaced by a current measuring reactor connected in a manner similar to that described in my above mentioned co-pending application, Serial Number 579,193. If the machine 46 is a generator, the control voltage $E_c$ should be connected to enhance current flow in the transistor 38 during the positive half cycles as discussed relative to Fig. 3 whereby an increase in the load current $I_5$ will reduce the average voltage $E_4$ in the field winding 45.

It is obvious that two control transistors 22' could be connected in parallel so that the same oscillator could control both the maximum current and the maximum voltage of a particular machine when the machine is a generator.

Current limit in a motor

However, if the dynamoelectric machine 46 is a motor and the current increases beyond the desired point, the field winding 45 should increase the excitation of the motor. To accomplish this, the transistor 22 (Fig. 1) is connected to the current measuring shunt 130 (as shown in Fig. 3) so that the positive half cycle duration time $t_1$ causes the transistor 38 to be conductive. With an increase in the current $I_5$, voltage $E_c$ operates to increase the field winding current $I_4$ in the field winding 45 (connected as a main field winding) which, in turn, increases the back electromotive force of the motor 46 and maintains the motor current $I_5$ near the desired maximum value at which time the impedance of the transistor 22 is stabilized.

Voltage and current limit

In Fig. 4, I have shown a dynamoelectric machine 46 adapted to have both its current $I_5$ and its voltage $E_5$ controlled by one control transistor 22' connectable in a circuit as shown in Fig. 3. As the voltage across the machine 46 builds up, a voltage $E_c'$ at the voltage tap 51 of the voltage divider 50 increases to a potential which will eventually cause conductance through a Zener diode 53' and the compensating rectifiers 54' to cause a current flow $I_a$ through the emitter and base electrodes of the transistor 22' sufficient to reduce the impedance of the transistor. Similarly, the maximum current is controlled by the shunt 130 in which an increasing load current will eventually build up to provide a control voltage $E_c''$ sufficient to cause conductance of a current $I_b$ in a Zener diode 153' and the compensating rectifiers 154' to enhance conductance in the transistor 22'.

However, in this modification, the rectifiers 54' block the current $I_b$ and the rectifiers 154' block the current $I_a$ to cause $I_a$ and/or $I_b$ to flow through the transistor 22' in a sense which will enhance conductance therethrough.

In Fig. 5, I have shown the characteristics of a generator controlled by an oscillator having the single control transistor 22' connected in the manner shown in Fig. 4. When the voltage of the generator 46 reaches the predetermined value OA such as 600 volts, the Zener diode 53' breaks down enhancing conductance of the transistor 22'. Thus, the terminal voltage of the generator is limited to this value.

As the current increases to some value OB such as 200 amperes, the Zener diode 153' will become conductive to limit the current $I_5$ and reduce the terminal voltage of the generator 46. At the point C, both $I_a$ and $I_b$ enhance conductance through the transistor 22'.

It should be noted that in the dotted region BD of the current limit curve, BC may be unattainable in practice. For instance, with the arrangement shown in Fig. 3, reduction of the impedance of the transistor 22' will not stop all excitation current flow, but, instead, will reduce it to a minimum where the transistor 22' has the minimum impedance. Depending on the relation of $E_0$, $E_0'$ and $E_1$, this region BD may be made a very small voltage so that any uncontrollable currents indicated by such operation will never occur in practice.

While I have shown and described particular embodiments of my invention, further modifications thereof may occur to those skilled in the art. For instance, it is obvious that the field winding 45 could be a main winding or a differential winding of the machine 46, a winding of an exciter machine, or another type of device responsive to the average voltage applied thereacross. It is also obvious that one of the control voltages could be a function of the speed of the machine 46 or another signal not illustrated. I intend, therefore, by the appended claims to cover all such modifications as fall within the true spirit and scope of my invention.

What I claim as new and desire to secure by Letters Patent of the United States is:

1. A control network comprising a rectangular wave oscillator having an integrated output voltage equal to zero, electric circuit means for connecting a unidirectional signal to said oscillator for varying the time duration of the half cycles of one polarity and a control device adapted to be energized by positive half cycles of said output voltage.

2. A control network for activating a switching device comprising a rectangular wave oscillator having an alternating output voltage signal, means connected to said oscillator for varying the half cycle time duration of unidirectional half cycles, and electric circuit means connecting the switching device to said oscillator in a sense whereby half cycles of one potential of this output wave will enhance current flow in the switching device and the half cycles of the other potential of the output wave will inhibit current flow in the switching device.

3. In a network delivering an output indication which is a joint function of two input stimuli, a rectangular wave generator developing an electric wave characterized by the absence of any substantial unidirectional component, means responsive to one of said input stimuli for modifying the characteristics of the rectangular output wave of said generator by varying the pulse width of only unidirectional pulses, variable impedance means connected in circuit with the output of said rectangular wave generator having high impedance when triggered by the negative portion of a rectangular wave and having low impedance when triggered by the positive portion of said rectangular wave, means for connecting the other of said stimuli to cause conductance in said variable impedance means during the positive portion of said rectangular wave, and load means connected in circuit with said second stimuli adapted to be energized as a function of said conductance.

4. A unidirectional rectangular wave oscillator comprising a saturable transformer provided with a first and a second similar primary winding, a source of voltage having a first, second, third and fourth terminal each at a different potential, a first transistor having its emitter and collector electrodes connected between one end of said first winding and said first terminal, electric circuit means connecting the other end of said first winding to said second terminal, a second transistor having its emitter and collector electrodes connected between one end of said second winding and said first terminal, electric circuit means for connecting the other end of said second winding to said source at said third terminal, means for alternately biasing each of said transistors in response to the flux excursion of said transformer whereby each of said transistors alternately carries current from said source to said primary windings during the periods between positive and negative saturation, and electric circuit means connected in circuit with one of said windings and said fourth terminal for varying the voltage across and the relative conductive time of one of said transistors whereby the time required to reach saturation is varied during half cycles of one polarity.

5. A voltage regulator for a dynamoelectric machine comprising a rectangular wave oscillator having an output voltage characterized by the absence of any substantial unidirectional component, a transistor connected to said output voltage in a sense whereby positive half cycles enhance current flow therein, a unidirectional current field winding adapted to excite the machine, said transistor and said field winding being serially connected across a source of power in a sense which will energize said winding whenever said transistor is conductive, and means including a control voltage connected to said oscillator for varying the pulse duration of half cycles of one polarity to thereby vary the proportion of time that said transistor is conductive.

6. A control circuit for limiting the maximum voltage and current output of a generator comprising a rectangular wave oscillator having an alternating output voltage with no unidirectional component, first circuit means connecting a first unidirectional signal proportional to the current of the generator to said oscillator and second electric circuit means connecting a second unidirectional signal proportional to terminal voltage of the generator to said oscillator, said first and said second signals adapted to change the time duration of only half cycles of one polarity, a switch means connected to said oscillator adapted to be conductive when said output voltage is positive with respect thereto, said switch means connected in circuit with a source of voltage for causing current flow through said switch means when conductive, means connected in circuit with said switch means and said source of voltage for sensing and integrating the resulting signal, and circuit means connected to said sensing means and the generator for limiting the excitation of the generator in response to a predetermined magnitude of either of said signals.

7. A unidirectional voltage control network comprising a saturable transformer provided with a first and a second similar primary winding, a source of voltage having a voltage $E_0$ between a first and second terminal, a first transistor having its emitter and collector electrodes connected between the one end of said first winding and said first terminal electric circuit means for connecting the other end of said first winding to said second terminal, a second transistor having its emitter and collector electrodes connected between one end of said second winding and said first terminal, electric circuit means for connecting the other end of said second winding to said source at a third terminal providing a voltage $E_0'$, means for alternately biasing each of said transistors in response to the flux excursion of said transformer whereby each of said transistors alternately carries current from said source to said primary windings during the periods between positive and negative saturation, electric circuit means connecting a voltage $E_1$ in circuit with one of said windings for varying the relative conductive time of one of said transistors whereby the time required to reach saturation is varied during half cycles of one polarity, a secondary winding on said saturable transformer having a rectangular output voltage $E_2$, a third transistor having its base and emitter electrodes connected to sense said voltage $E_2$, said third transistor having its emitter and collector electrodes connected in circuit with a source of power and a load in a sense whereby the average conductance through said third transistor controls the average of the voltage in said load device.

8. A unidirectional voltage control network comprising a saturable transformer provided with a pair of similar primary windings, a source of voltage, a first transistor having its emitter and collector electrodes connected in circuit with a first of said windings and one terminal of said source for carrying a current therebetween, a second transistor having its emitter and collector electrodes connected between one end of the second of said primary windings and said one terminal for carrying a current therebetween, electric circuit means for connecting the other end of said first and second windings to said source, means for alternately biasing each of said transistors to enhance conductance therein in response to the flux excursion of said transformer whereby each of said transistors alternately completes a circuit between said primary windings and said source during the periods between positive and negative saturation, a second source of voltage, electric circuit means for connecting a controllable portion of said second voltage source in circuit with said second winding for varying the relative conductive time of said second transistor whereby the time required to reach saturation is variable during half cycles when said second transistor is conductive, a secondary winding on said saturable transformer having a rectangular wave output voltage, and a load device connected in circuit with said secondary winding and a source of power in a sense whereby the average time duration of said output voltage controls the average power in said load.

9. A transistor voltage regulator for a unidirectional electric machine comprising a saturable transformer having a pair of similar primary windings, said transformer having a secondary winding and two tertiary windings, a pair of transistors connected to said tertiary windings in a sense whereby induced voltages of said tertiary windings alternately enhance current flow therein, each of said transistors being connected to one end of each of said primary windings respectively for allowing current flow alternately in said primary windings, electric circuit connections between the other end, a first of said windings and a first of said transistors for applying a voltage $E_0$ thereacross, a voltage divider consisting of a fixed resistor and a variable impedance for applying a voltage equal to or greater than $E_0'$ and less than or equal to $E_0+E_1$ across the second of said transistors and the second of said windings, a reference voltage connected to said variable impedance device to control its impedance between substantially infinity and a very low value thereby modifying the half cycle time duration during which said second transistor is conductive, a field winding connectable to a source of voltage $E_3$ for energizing said machine, a third transistor connected to said oscillator in a sense whereby an output voltage of said secondary winding will promote current flow in said third transistor during positive half cycles thereof, said third transistor being arranged in circuit with said field winding for completing the connection of said field winding to a source of voltage whereby a signal voltage controlling the impedance of said variable impedance device determines the percentage of the time that said fourth transistor is conductive.

10. A transistor voltage regulator for a unidirectional electric machine comprising a saturable transformer having a pair of similar primary windings, said transformer having a secondary winding and two tertiary windings, a pair of transistors connected to said tertiary windings in a sense whereby induced voltages of said tertiary windings alternately enhance current flow therein, said transistors being connected between one end of each of said primary windings and a voltage terminal for allowing current flow alternately in one of said primary windings respectively, electric circuit means between the other end of one of said windings to a fixed voltage terminal, other electric circuit means connecting the other end of the other of said primary windings to a voltage tap on a divider for providing a variable voltage potential across said other primary windings, electric circuit means adapted to connect a voltage signal from terminals of said machine to a variable impedance in circuit with said voltage tap to provide a control voltage for modulating the half cycle time duration during which said other primary winding is conductive, a reference voltage signal device connected in circuit with said machine terminals whereby only a differential signal equal to the excess of said voltage signal over said reference signal will modify the potential of said voltage tap, a field winding connectable to a source of voltage $E_3$ for energizing said generator, a third transistor connected to said oscillator in a sense whereby an output voltage of said secondary winding will promote current flow in said third transistor during positive half cycles thereof, said third transistor being arranged in circuit with said field winding and said source of voltage $E_3$ for completing the connection of said field winding to said source whereby said differential signal determines the percentage of the time that said field winding is energized.

11. A transistor voltage regulator for a unidirectional electric generator comprising, a rectangular wave oscillator having an output voltage characterized by the absence of any integrated unidirectional components, a first transistor connected to said output voltage in a sense to enhance current flow in said transistor during positive pulses of said output voltage, a field winding of the generator connected to one voltage terminal of the generator and adapted to be connected to the other voltage terminal to be energized thereby when said transistor is conductive, a current sensing means connected in circuit with the generator adapted to provide a potential proportional to the load current of the generator, a Zener diode, a second transistor, said diode and said second transistor being connected across said sensing means in a sense whereby said load current tends to cause reverse current flow in said diode to allow current flow in said second transistor at a value dependent on the breakdown voltage of said diode, means for connecting said second transistor to said oscillator for modulating the time duration of half cycles of one polarity of the voltage output thereby controlling the average time of conductance of said first transistor, and a diode connected across said field winding in a sense to pass current of said winding when said transistor is non-conductive for commutating said field winding thereby reducing ripple currents in said winding.

12. A transistor voltage regulator for a unidirectional generator comprising, a rectangular wave oscillator having an output voltage characterized by the absence of any substantial unidirectional component, a transistor connected to said output voltage of said square wave oscillator in a sense whereby positive half cycles enhance current flow therethrough, a field winding adapted to energize the generator, said transistor and said winding being connected serially across voltage terminals in a sense whereby said winding will be energized thereby when said transistor is conductive, means connected in circuit with said generator for deriving a signal when the generator load current is greater than a predetermined value, and electric circuit means connecting said signal to said oscillator for varying the time duration of half cycles of one polarity to thereby vary the proportion of time that said transistor is conductive and the energization of said winding, and commutating means connected in circuit with said winding for integrating the voltage thereacross.

13. A voltage divider consisting of a relatively fixed resistor, a transistor having its collector and emitter electrodes connected in series with said resistor across a source of voltage, and a voltage tap connected to the series circuit at a point electrically between said resistor and said transistor, said resistor having an impedance at least one hundred times as great as the minimum impedance of said transistor and less than one hundredth the maximum impedance of said transistor, whereby a signal between the base and emitter electrodes of said transistor is adapted to vary the potential of said tap over substantially the entire range of voltage of said source.

References Cited in the file of this patent

UNITED STATES PATENTS

| 2,055,208 | Rumpel | Sept. 22, 1936 |
| 2,740,086 | Evans et al. | Mar. 27, 1956 |
| 2,748,274 | Pearlman | May 29, 1956 |
| 2,774,878 | Jensen | Dec. 18, 1956 |
| 2,783,380 | Bonn | Feb. 26, 1957 |
| 2,783,384 | Bright et al. | Feb. 26, 1957 |

OTHER REFERENCES

"Operation of Saturable-Core Square Wave Oscillator," by D. C. Morgan; May 16, 1956, pub. by Minneapolis-Honeywell Regulator Co.

"Transistors as On-Off Switches in Saturable-Core Circuits," Electrical Manufacturing, pp. 79–82, December 1954.

UNITED STATES PATENT OFFICE

Certificate of Correction

Patent No. 2,866,944 December 30, 1958

William B. Zelina

It is hereby certified that error appears in the printed specification of the above numbered patent requiring correction and that the said Letters Patent should read as corrected below.

Column 10, line 23, for "equal to $E_0+E_1$" read —equal to $E_0'+E_1$—.

Signed and sealed this 8th day of March 1960.

[SEAL]

Attest:
KARL H. AXLINE,
*Attesting Officer.*

ROBERT C. WATSON,
*Commissioner of Patents.*